United States Patent [19]
Frodigh et al.

[11] Patent Number: 6,122,293
[45] Date of Patent: Sep. 19, 2000

[54] METHOD AND SYSTEM FOR LINK ADAPTATION HAVING A VARIABLE UPDATE INTERVAL

[75] Inventors: Magnus Frodigh, Sollentuna; J. Christer Johansson, Solna; Anders Furuskär, Stockholm, all of Sweden

[73] Assignee: Telefonaktiebolaget LM Ericsson, Stockholm, Sweden

[21] Appl. No.: 09/023,301

[22] Filed: Feb. 13, 1998

[51] Int. Cl.[7] ........................................ H04J 3/24
[52] U.S. Cl. ................................ 370/473; 375/295
[58] Field of Search ........................ 375/224, 295; 370/395, 392, 466, 469, 473; 714/748, 747

[56] References Cited

U.S. PATENT DOCUMENTS

| | | | |
|---|---|---|---|
| 4,710,925 | 12/1987 | Negi | 371/5 |
| 5,577,087 | 11/1996 | Furuya | 375/377 |
| 5,793,744 | 8/1998 | Kanerva et al. | 370/209 |
| 5,809,427 | 9/1998 | Perreault et al. | 455/513 |
| 5,831,690 | 11/1998 | Lyons et al. | 348/845.2 |
| 5,896,375 | 4/1999 | Dent et al. | 370/347 |
| 5,917,840 | 6/1999 | Cheney et al. | 714/807 |
| 5,923,642 | 7/1999 | Young | 370/206 |
| 5,936,966 | 8/1999 | Ogawa et al. | 370/469 |
| 6,034,970 | 3/2000 | Levac et al. | 370/466 |

FOREIGN PATENT DOCUMENTS

| | | |
|---|---|---|
| 532485 | 3/1993 | European Pat. Off. . |

OTHER PUBLICATIONS

European Standard Search Report re RS 100660 Date of completion of search: Apr. 29, 1998.

J. E. Kleider et al.: *"An Adaptive–Rate Digital Communication System for Speech"*, 1997 IEEE Internationl Conference on Acoustics, Speech, and Signal Processing (Cat. No. 97CB36052), Apr. 21–24, 1997, pp. 1695–1698, vol. 3.

Dalibor Turina et al.: *"A Proposal for Multi–Slot MAC Layer Operation for Packet Data Channel in GSM"*, ICUPC, '96, vol. 2, pp. 572–276.

*Primary Examiner*—Chi H. Pham
*Assistant Examiner*—Emmanuel Bayard
*Attorney, Agent, or Firm*—Burns, Doane, Swecker & Mathis, L.L.P.

[57] ABSTRACT

A communication system supports multiple modulation/FEC coding schemes. One scheme is selected for initiating transmission on the link. The performance of the transmissions is evaluated after a variable update interval expires. The update interval is varied as a function of time, amount of information, LLC blocks, etc., in order to optimize throughput in the system. A shorter update interval can be used initially until an optimal modulation/FEC coding scheme is determined for a particular data transmission.

21 Claims, 3 Drawing Sheets

METHOD AND SYSTEM FOR LINK ADAPTATION HAVING A VARIABLE UPDATE INTERVAL

BACKGROUND

The present invention generally relates to increasing data throughput or quality in a wireless communication system and, more particularly, to systems and methods involving adaptive modulation and FEC coding schemes.

The growth of commercial communication systems and, in particular, the explosive growth of cellular radiotelephone systems have compelled system designers to search for ways to increase system capacity without reducing communication quality beyond consumer tolerance thresholds. At the same time usage of mobile communication equipment for transmission of data rather than speech has become increasingly popular by consumers. The ability to send and receive electronic mail and to use a web browser to obtain world-wide-web access is frequently discussed among services that will be used more and more in wireless communication systems. In response to this, communication system designers search for ways to efficiently transfer data information to and from mobile users.

There are fundamental differences between requirements for data communication and e.g., speech communication. For example, delay requirements are higher for speech, which is a real time service, and the error requirements are higher for data communication, while the delay constraints are lower. The use of packet data protocols, which are more suitable for transmission of data than circuit switched protocols, starts to find its way into cellular communication systems. Packet service integration in both GSM cellular systems as well as DAMPS cellular systems is presently being standardized.

Today, GSM systems provide a circuit switched data service, which can be used to interconnect with external data networks. The circuit switched data service is used for both circuit switched as well as packet switched data communication. To make packet switched data communication more efficient, a new packet switched data service called GPRS, (General Packet Radio Services) is introduced. GPRS will support both connectionless protocols (e.g., IP) as well as a connection-oriented protocol (X.25). One of the advantages with a packet switched data communication protocol is that a single transmission resource can be shared between a number of users. Thus, in the case of e.g., a GSM cellular system, a timeslot on a radiofrequency carrier can be utilized by several mobile users for reception and transmission of data.

GPRS is a GSM service and parts of the GSM infrastructure will be used. The GSM communication system is described in the European Telecommunication Standard Institute (ETSI) documents referenced below.

The aims of introducing a packet data protocol in cellular systems are mainly to be able to support high data rate transmissions and at the same time achieve flexibility and efficient utilization of the radio frequency bandwidth over the air interface. The concept of GPRS can be implemented in any TDMA system and extended also for multicarrier/multislot protocols, where a single user is allowed to occupy more than one transmission resource simultaneously.

In order to provide various communication services, a corresponding minimum user bit rate is required. For example, for voice and/or data services, user bit rate corresponds to voice quality and/or data throughput with a higher user bit rate producing better voice quality and/or higher data throughput. The total user bit rate is determined by a selected combination of channel FEC coding and modulation, in combination with the number of transmission resources allocated for a user. For example, in a TDMA system the number of transmission resources corresponds to the number of timeslots.

Different communication systems use different FEC coding schemes to communicate voice or data information. The modulation techniques include, for example, Gaussian Minimum Shift Keying (GMSK), Quadrature Phase Shift Keying (QPSK) and different levels of Quadrature Amplitude Modulation (QAM). Combinations of the FEC coding and modulation schemes may provide different user bit rates. Usually a high user bit rate combination implies a need for a channel with low interference level, whereas a low user bit rate combination has a lower requirement on interference. A conventional term used to indicate tolerance to high or low interference levels is robustness. The robustness is usually indicated by a carrier-to-interference level measure (C/I ratio). This ratio expresses the relation between the signal strength of the useful signal on a radio channel and the interference level on that channel. Other indications of robustness may also be applied, e.g., carrier to noise ratio (C/N). For brevity, C/I is used throughout this text.

Conventionally, a communication system operates using a single modulation scheme and a single FEC coding scheme with a certain rate for transmission of information under all radio channel conditions. However, as the number of mobile users increases, the radio channel conditions become more diverse in different areas and at different times. The interference from several simultaneous transmissions may severely degrade performance for a certain combination of modulation and FEC coding with a high user bit rate, while at other instants, the interference level may be low enough to allow for such a combination. More recently, however, dynamic adaptation of modulation and FEC coding scheme combinations used for transmission in radiocommunication systems has been considered as an alternative. Depending upon the radio channel conditions, a suitable combination with a sufficient robustness may be applied and an optimal user bit rate may be provided. Switching between different combinations of modulation and FEC coding during transmission is called link adaptation and this feature is being considered for future radiocommunication systems and as an improvement for existing systems. An example of a communication system employing multiple modulation schemes is found in U.S. Pat. No. 5,577,087. Therein a technique for switching between a higher level QAM and QPSK is described. The decision to switch between modulation types is made based on quality measurements, however this system employs a constant user bit rate which means that a change in modulation also requires a change in channel user bit rate, e.g., the number of timeslots used to support a transmission channel.

Thus, it is possible to consider providing different link protocols, i.e., combinations of different types of modulation and channel FEC coding in one system, which link protocols are adaptively changed for a particular radio channel condition, i.e., radio link. For example, two link protocols may exist in a system, where one has a lower robustness (i.e., using less FEC coding and/or a less robust modulation) and one has a higher robustness (i.e., using more FEC coding and/or more robust modulation). The link protocol being used by the system at any given time is referred to herein as a realization.

Link protocol performance can be characterized by Bit Error Rates (BER) as a function of signal quality, e.g., C/I.

A less robust link protocol is typically sensitive to interference, i.e., needs high C/I to achieve low BER. On the other hand, a less robust protocol also provides a higher user bit rate. Since the C/I varies between links in a system, different protocols are suited for different links. A link adaptation algorithm adaptively selects the realization that maximizes the throughput or user perceived quality. Since the C/I varies with time, the realization should be reevaluated continuously. The time between these realization reevaluations is referred to herein as the update interval.

When a transmission link is initially established, there may be no or limited previous information regarding the quality of the radio channel. It is therefore difficult to select the correct realization from the beginning, i.e., an initial realization that maximizes the throughput on that particular radio channel. Thus, it is likely that a non-optimal (e.g., fixed/default or based on inaccurate link quality estimates) realization will be used as an initial choice.

It is known in the literature that evaluating the performance of a particular realization and selectively change to another realization, i.e., link protocol, has occurred at fixed update intervals. However, Applicants have recognized that using a fixed update interval for link adaptation may lessen throughput because, for example, the initial realization is frequently non-optimal. Thus innovative techniques for link adaptation techniques are needed.

SUMMARY

These and other drawbacks and limitations of conventional methods and systems for communicating information are overcome according to the present invention, wherein Applicants present techniques and systems for a variable update interval which increases system throughput. The update interval can be variable, for example, in terms of time, amount of information, erroneously transmitted blocks, or LLC frames. The duration of the update interval can be changed based upon parameters such as, the existence and/or reliability of link quality measurements, total amount of data to be transmitted and the quality of transmission during the previous update interval.

According to one exemplary embodiment, an initial update interval has a relatively short duration. In this way, if a non-optimal realization is selected initially, it can be rapidly changed to a more optimal realization so that the deleterious effects of the poor initial selection are minimized.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

The following exemplary embodiments are provided in the context of TDMA radiocommunication systems. However, those skilled in the art will appreciate that this access methodology is merely used for the purposes of illustration and that the present invention is readily applicable to all types of access methodologies including frequency division multiple access (FDMA), TDMA, code division multiple access (CDMA) and hybrids thereof.

Moreover, operation in accordance with GSM communication systems is described in European Telecommunication Standard Institute (ETSI) documents ETS 300 573, ETS 300 574 and ETS 300 578, which are hereby incorporated by reference. Therefore, the operation of the GSM system in conjunction with the proposed GPRS optimization for packet data (hereafter referred to simply as "GPRS") is only described herein to the extent necessary for understanding the present invention. Although, the present invention is described in terms of exemplary embodiments in an enhanced GPRS system, those skilled in the art will appreciate that the present invention could be used in a wide variety of other digital communication systems, such as those based on PDC or D-AMPS standards and enhancements thereof. Moreover, although the present invention is described in the context of packet-switched connections, it is equally applicable to circuit-switched connections.

Figure 1:
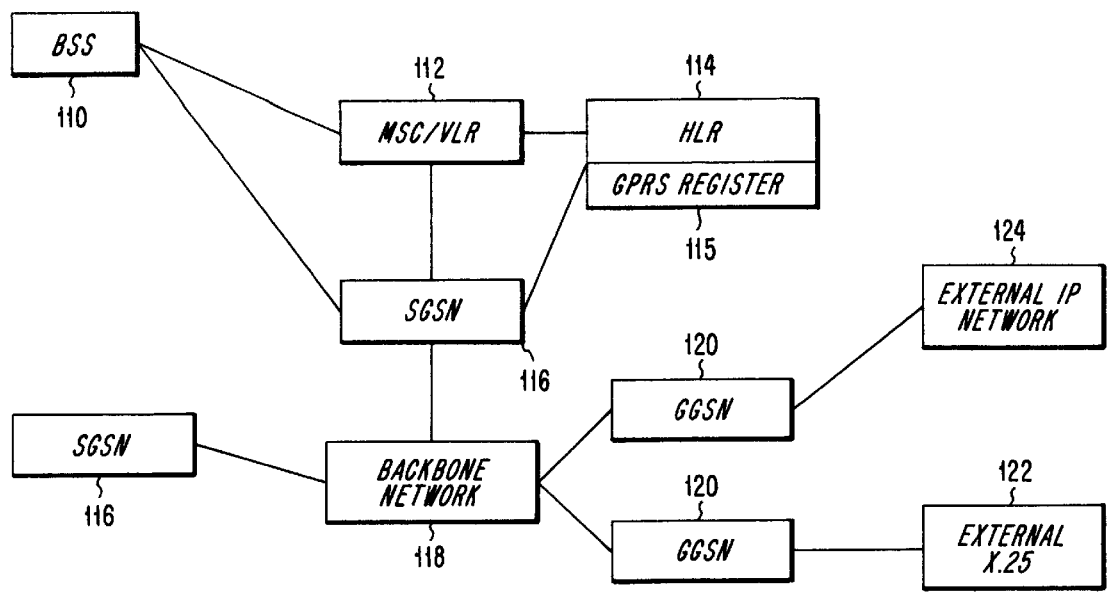
FIG. 1 is a block diagram of an exemplary GPRS network in which the present invention can be implemented.

An overview of the GPRS network architecture can be found in FIG. 1.

Information packets from external networks 122, 124 will enter the GPRS network at a GGSN (Gateway GPRS Service Node) 120. The packet is then routed from the GGSN via a backbone network, 118, to a SGSN (Serving GPRS Support Node), 116, that is serving the area in which the addressed GPRS mobile resides. From the SGSN the packets are routed to the correct BSS, (Base Station System), in a dedicated GPRS transmission. A GPRS register may, or may not be integrated with the HLR (Hone Location Register) of the GSM system. Subscriber data may be interchanged between the SGSN and MSC to ensure service interaction, such as e.g., restricted roaming.

Figure 2:
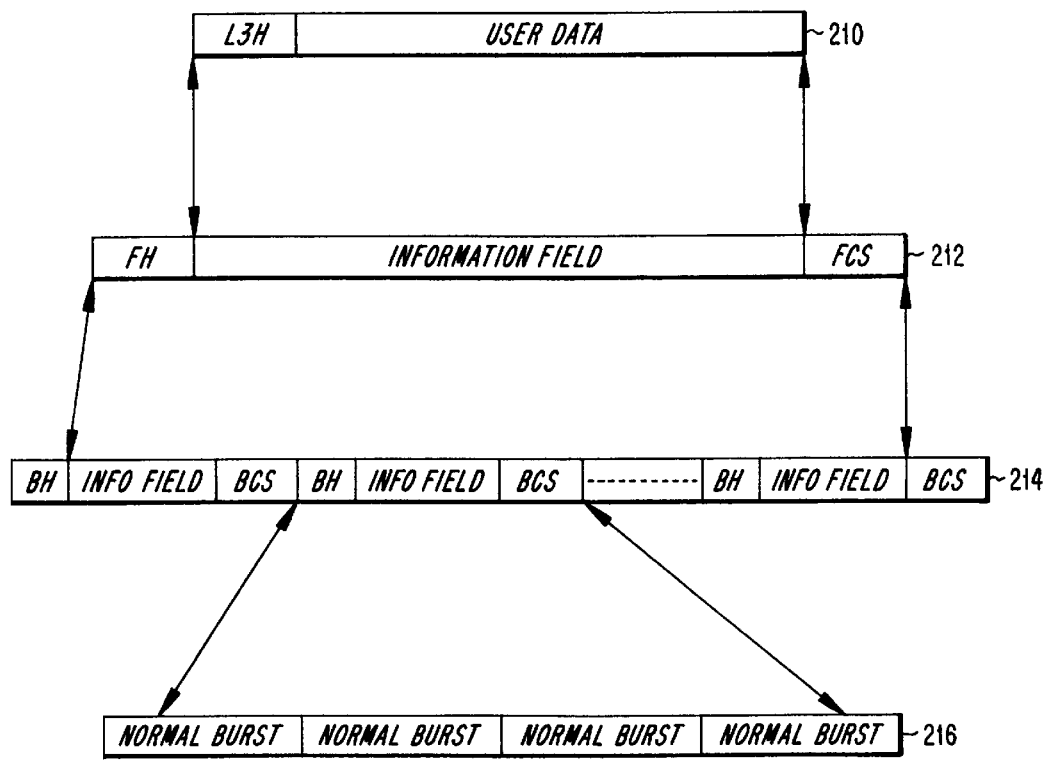
FIG. 2 depicts an exemplary packet transformation flow for the system of FIG. 1.

In FIG. 2 is depicted a packet transformation flow for a GPRS system. This is also briefly described in the article by D. Turina et al, entitled "*A Proposal For Multi-Slot MAC Layer Operation for Packet Data Channel in GSM*", *ICUPC*, '96, vol. 2, pp. 572–276, the disclosure of which is hereby incorporated by reference. The packets which are received from the network, 210, are mapped onto one or more logical link control (LLC) frames 212, each containing an information field, a frame header (FH) and a frame check sequence (FCS). An LLC frame is mapped onto a plurality of radio link control blocks (RLC blocks) or radio blocks 216, each of which include a block header (BH), information field and block check sequence (BCS), which can be used in the receiver to check for errors in the information field. The radio blocks are further mapped into physical layer bursts. In a GPRS system, one radio block is mapped onto four bursts in the GSM transmission protocol.

In systems according to the present invention, the mobile stations (not shown) and BSSs 110 support at least two link protocols (i.e., FEC coding and/or modulation schemes). For more details regarding exemplary mobile station and base station implementations, the interested reader is referred to U.S. patent application Ser. No. 08/921,319, entitled "A Link Adaptation Method For Links Using Modulation Schemes That Have Different Symbol Rates", to Magnus Frodigh et al., and filed on Aug. 29, 1997, the disclosure of which is expressly incorporated here by reference. Thus, such a system could have at least two modulation schemes and one FEC coding scheme, at least two FEC coding schemes and one modulation scheme or plural modulation schemes and plural FEC coding schemes. The selection of one of the link protocols as the initial realization can be performed in any desired manner, e.g., a default initial realization can be designated or the system can attempt to determine an initial realization based upon any desired parameter (i.e., anticipated channel quality, desired bitrate of the connection, amount of data to be transmitted etc.).

After the link has been established using the initial realization, the link performance will be evaluated to determine whether the initial realization is optimal for this particular link. Additionally, the realization should be evaluated on an ongoing basis since link quality may change significantly over time. As described above, link quality can be evaluated at fixed update intervals, e.g., every 200 ms. However, fixed update intervals may not provide optimal throughput under some circumstances.

For example, to maximize the throughput of an entire transmission it is necessary to select the correct realization from the beginning. That is not possible without information regarding the channel quality in advance of the actual transmission. The first part of the transmission may, therefore, be inefficient and submitted to increased delay. This problem is especially severe in mobile applications, where a large fraction of very short transmissions can be expected. For short transmissions the entire transmission may take place using a non-optimal realization before a realization change can be made.

Figure 3:
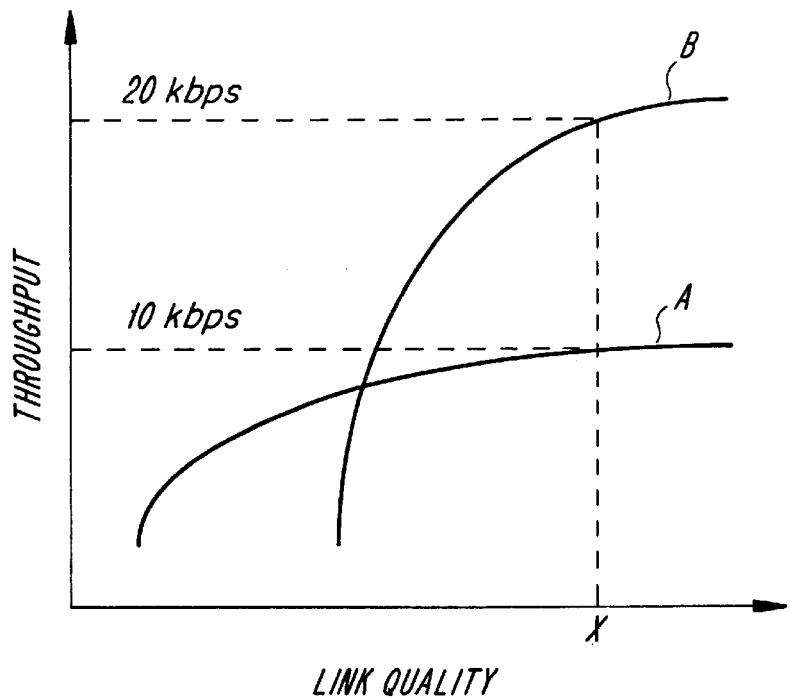
FIG. 3 is a graph illustrating data throughput as a function of link quality for two different modulation/FEC coding schemes.

This problem, and the solution according to the present invention, will be best understood by considering an illustrative example. Suppose that a user in the GPRS system described above (having two different link protocols) is just about to initiate a data transmission of 4 kbits. At this particular instant in time, the link quality for this user is such that the achievable data rates for the two realizations are 10 kbps and 20 kbps, respectively. This is illustrated in the graph of FIG. 3, which depicts an exemplary relationship between throughput and link quality. Therein the more robust realization A provides 10 kbps at link quality 'X', while the less robust realization B provides 20 kbps for the same link quality.

Figure 4:
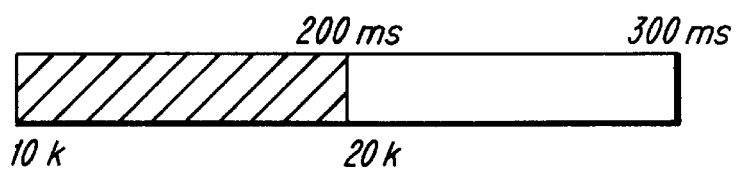
FIG. 4 depicts an amount of time used to transmit data when using a conventional, fixed update interval.

The system, however, typically has no or limited knowledge of the link quality at this particular time and, therefore, selects the more robust realization initially, in this case realization A. First, assume that fixed length update intervals of, e.g., 200 ms are used. In this case, 2 kbits of the transmission will be transmitted using the non-optimal modulation and FEC coding scheme A, i.e., at 10 kbps, before a switch to the optimal selection can be performed after the fixed update interval. After the reselection, the remaining 2 kbits of the transmission can transmitted at 20 kbps. Thus, the total transmission time of the packet using a fixed update interval is 300 ms as illustrated in FIG. 4.

Figure 5:
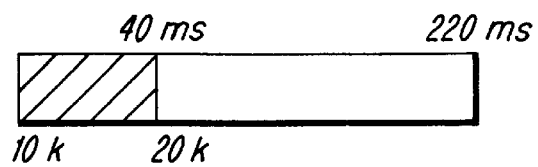
FIG. 5 depicts an amount of time used to transmit the same data as in FIG. 4, but using a variable update interval in accordance with an exemplary embodiment of the present invention.

Next, using the teachings of the present invention, assume that the update interval is variable. In particular, assume that a relatively short initial update interval of, e.g., 40, ms is used due to the lack of link quality measurements at the start of the transmission. In this case, only 0.4 kbits are transmitted using the non-optimal realization A, whereas the remaining 3.6 kbit are sent using the optimal realization B as seen in FIG. 5. The total transmission time has now decreased to 220 ms; a decrease of 27%, corresponding to a throughput increase of 36%.

The foregoing illustrates one example of variable update intervals for link protocol evaluation, i.e., making the initial update interval relatively small to reduce the impact of a non-optimal initial realization selection. However, the present invention encompasses all types of variable update intervals and many different techniques for adaptively selecting a particular sequence of update intervals based upon the characteristics of a contemplated data transmission.

For example, in addition to varying the update interval as a function of time, the update interval may also be variable in terms of:

1) transmission size [bits/bytes/blocks] of the data packets, e.g., a first update occurs after 5 blocks have been transmitted, while a second update occurs after another 10 blocks are transmitted;

2) the number of erroneously received failed blocks reported, e.g., a first update occurs after 5 erroneously received blocks are reported and a second update occurs after another 10 erroneously received blocks are reported; and/or 3) a number of LLC frames, in one specific exemplary embodiment based on the GPRS system, e.g., a first update occurs after 5 LLC frames have been transmitted and a second update occurs after 10 LLC frames have been transmitted. Moreover any combination of these parameters could be used to create a variable update interval function.

In addition to the parameters which dictate when update intervals occur in the transmission cycle, the lengths of the update intervals may also vary based on one or more of:

a) existence or reliability of link quality measurements, e.g., the fewer or less reliable the link quality measurements, the shorter the update interval;

b) size of information to be transmitted, e.g., the less information to be transmitted, the smaller the update interval; and c) quality of transmission during last update interval, e.g., the lower the quality of transmission, the smaller the next update interval will be.

The example described above with respect to FIGS. 4 and 5 illustrates how the update interval can be varied when the link quality measurements are nonexistent, or have lower reliability, in the beginning of the transmission. However, the same conditions may also apply after inter- or intra-cell handovers to another channel. A change of the update interval may also be desirable just after a request for changing realization or based upon the frequency of realization change requests. The reliability of the link quality measurements may actually be measured in terms of, e.g,. standard deviation. When the reliability of the link quality measurements is low, a shorter update interval is typically used.

Figure 6:
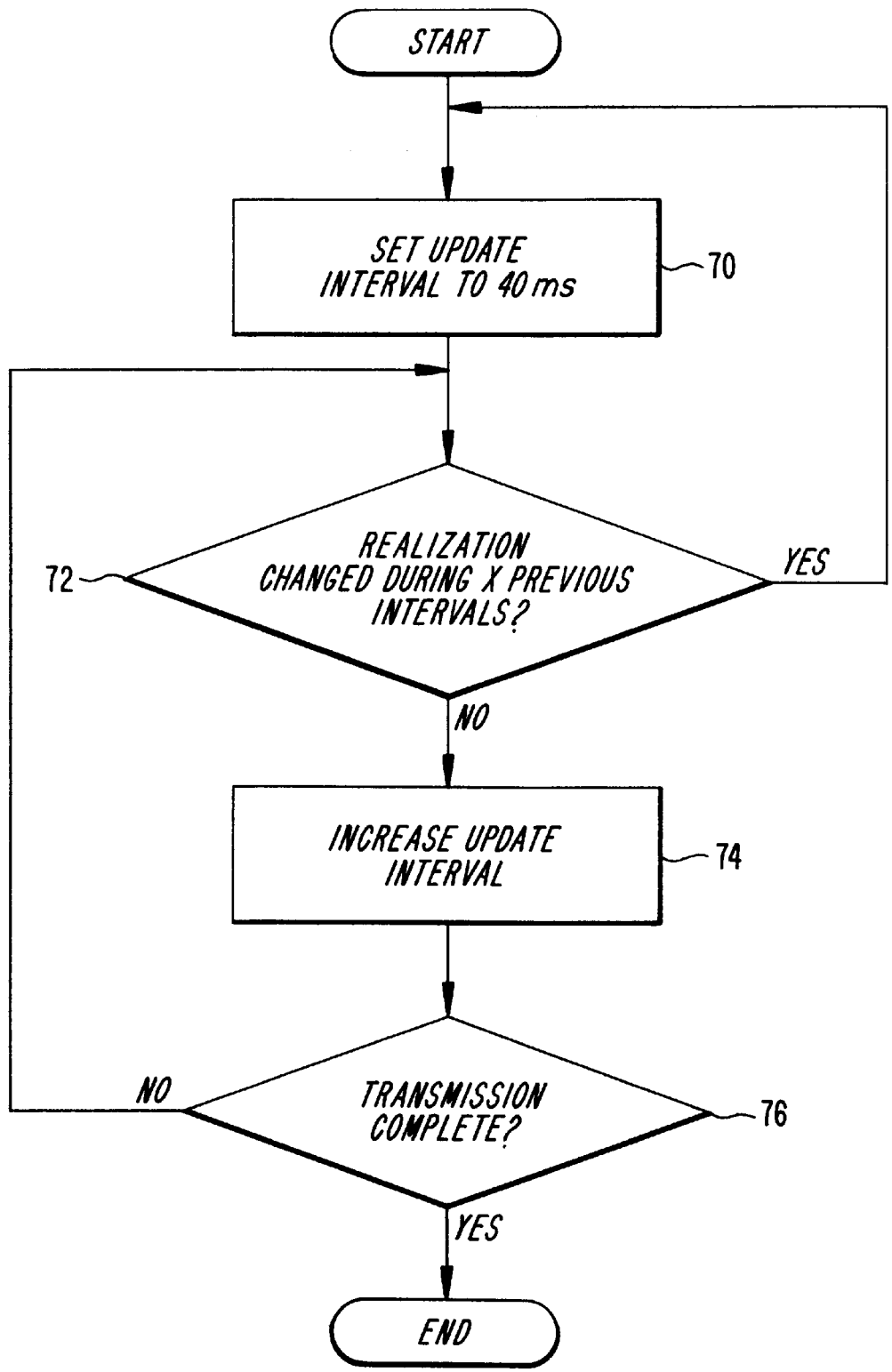
FIG. 6 is a flowchart illustrating how an update interval can be varied as a function of time according to one exemplary embodiment of the present invention.

According to an exemplary embodiment of the present invention, the lengths of the update intervals may be controlled in the following manner with reference to the flow-chart of FIG. 6. Initially, a short update interval, e.g., 40 ms, is used at step 70. If no realization changes are made after one or more update intervals have elapsed (step 72), e.g., because the bit error rate and/or the throughput are acceptable, then the variable update interval can be increased, e.g., by another 40 ms, at step 74. Otherwise, if a realization change (or request therefor) is made, the update interval is reset to the initial shorter value by following the "YES" branch from decision block 74. Alternatively, the update interval can also be reset whenever a predetermined event, e.g., handoff, occurs that would benefit from a shorter update interval. This process can provide successive increases in the length of the update interval as illustrated by block 76, until the transmission is ended.

Another factor which can be considered in setting the initial update interval at step 70 is the time since a last transmission occurred. For example, if the time since the last transmission is short, a longer initial update interval, e.g., 60 ms, could be used. A timer (not shown) that tracks the time since the last transmission can be used to determine how long the initial update interval should be. The longer the time that has passed since the last transmission, the shorter initial update interval's duration. With the additional information of the frequency of the realization changes, the timer thresholds can be set to different values. For example, a previously high frequency of realization changes implies shorter update time intervals.

In one exemplary embodiment where link adaptation is performed on an LLC level, i.e., the update interval ends after each LLC frame, the size of LLC blocks may be utilized to achieve a shorter initial update interval. When the network packet data is segmented into several LLC frames, this segmentation seldom results in a whole number of LLC frames having full length. Typically, at least one LLC frame is shorter than a full frame, which frame is typically the last LLC frame in the sequence. By transmitting this last LLC frame first, the initial update interval can be made as short as possible, i.e., as short as the shortest LLC frame. It would also be possible to specify a certain length of the first LLC frame transmitted, and consider this length in the mapping from the network packet data as well.

According to another embodiment, the update interval can be varied based upon the change in realization. For example, if a system has six different link protocols of varying robustness, a very short update interval may be used after a change from the most robust link protocol to the least robust protocol. Alternatively, if the change is only from the most robust link protocol to the second most robust protocol, then a larger update interval can be used.

Although the invention has been described in detail with reference only to a few exemplary embodiments, those skilled in the art will appreciate that various modifications can be made without departing from the invention. Accordingly, the invention is defined only by the following claims which are intended to embrace all equivalents thereof.

What is claimed is:

1. A method for transmitting information in a communication system comprising the steps of:

(a) selecting a first realization for transmitting said information;
   (b) transmitting said information using said first realization during a first update interval;
   (c) evaluating a performance associated with information transmitted using said first realization;
   (d) selectively changing to a second realization based upon a result of said evaluating step; and
   (e) continuing to transmit said information during a second update interval using one of said first and second realizations, wherein said second update interval has a different duration than said first update interval.

2. The method of claim 1, further comprising the step of:
   selecting durations for at least one of said first and second update intervals based on at least one of: existence/reliability of link quality measurements, transmission size, an amount of change realization robustness and quality of transmission during a previous update interval.

3. The method of claim 1 wherein said information includes data packets.

4. The method of claim 1 further comprising the step of:
   using said first update interval after one of the following events occur: handover, channel reselection and a realization change.

5. The method of claim 4, wherein said first update interval is shorter than said second update interval.

6. The method of claim 4 wherein said first update interval is only used after said event if a certain time has passed since a last transmission occurred.

7. The method of claim 1 wherein said first and second update intervals correspond to multiples of whole logical link control (LLC) frames.

8. A method for transmitting data in a communication system comprising the steps of:
   transmitting data using a link protocol; and
   evaluating said transmitted data to determine if a change in said link protocol is desirable after a variable update interval expires.

9. The method of claim 8, wherein said variable update interval varies in terms of time.

10. The method of claim 8, wherein said variable update interval varies in terms of total data to be transmitted.

11. The method of claim 8, wherein said variable update interval varies in terms of a number of failed data blocks reported.

12. The method of claim 8, wherein said variable update interval varies in terms of a number of logical link control (LLC) frames.

13. The method of claim 8, wherein a duration of said variable update interval varies based upon at least one of: existence/reliability of link quality measurements, transmission size, and quality of transmission during a previous update interval.

14. The method of claim 8, wherein said variable update interval is determined by:
    starting with an initial update interval; and
    successively increasing a duration of said initial update interval unless a predetermined event occurs.

15. The method of claim 14, wherein said predetermined event is one of: a handoff, a channel reselection and a realization change.

16. The method of claim 8, wherein said link protocol is a modulation/FEC coding scheme and said step of evaluating further comprises the step of:
    evaluating bit error rate performance of said transmitted data and selectively changing to a different link protocol for transmissions performed until a next variable update interval.

17. A transmission device comprising:
    a transmitter for transmitting data using a selected one of at least two modulation/FEC coding schemes; and
    a processor for evaluating a quality of said transmission to determine if a change in said selected modulation/FEC coding scheme is desirable at the end of a variable update interval.

18. The transmission device of claim 17, wherein said variable update interval varies in terms of at least one of: amount of information, failed blocks and logical link control (LLC) frames.

19. The transmission device of claim 17, wherein a duration of said variable update interval varies in terms of at least one of: existence/reliability of link quality measurements, transmission size, and quality of transmission during a previous update interval.

20. The transmission device of claim 17, where said processor changes said selected modulation/FEC coding scheme at the end of said variable update interval if transmission performance is below a predetermined threshold.

21. A method for evaluating a currently selected one of a plurality of link protocols comprising the step of:

evaluating said currently selected link protocol after a variable update interval expires, said variable update interval having a duration based on at least one of: existence/reliability of link quality measurements, transmission size, and quality of transmission during a previous update interval and selectively changing said currently selected link protocol based on a result of said evaluation.

* * * * *